No. 612,230. Patented Oct. 11, 1898.
N. S. BEARDSLEE.
SALT GRAINER.
(Application filed Oct. 21, 1897.)
(No Model.)

Witnesses
Chas. K. Davis.
E. W. Oyster.

Inventor
N. S. Beardslee.
By W. H. Bartlett.
Attorney

UNITED STATES PATENT OFFICE.

NATHAN S. BEARDSLEE, OF WARSAW, NEW YORK.

SALT-GRAINER.

SPECIFICATION forming part of Letters Patent No. 612,230, dated October 11, 1898.

Application filed October 21, 1897. Serial No. 655,915. (No model.)

*To all whom it may concern:*

Be it known that I, NATHAN S. BEARDSLEE, residing at Warsaw, in the county of Wyoming and State of New York, have invented certain new and useful Improvements in Salt-Evaporators, of which the following is a specification, reference being had therein to the accompanying drawings.

This invention relates to salt-making; and it consists in certain improvements in what are known as "salt-grainers."

In salt-making there are three distinct systems well known. One system is the evaporation of brine in open pans heated from outside, known as "evaporating-pans." Another system uses vacuum heaters. A third system uses open receptacles heated from inside, usually by steam-pipes passing through the receptacles, and such are called "grainers." My present invention is illustrated as applied particularly to grainers, although some features are applicable to other forms of evaporators.

The object of the invention is to so improve the evaporating vessel that a high grade of salt can be made from brine at small expense.

Figure 1:
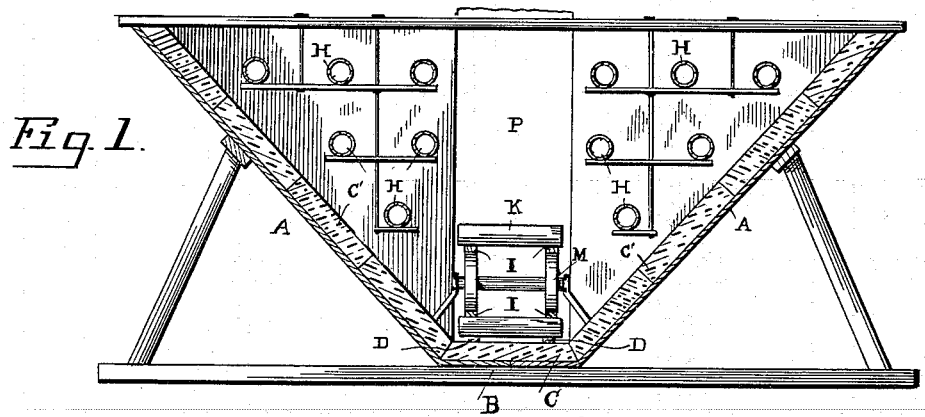
Figure 2:
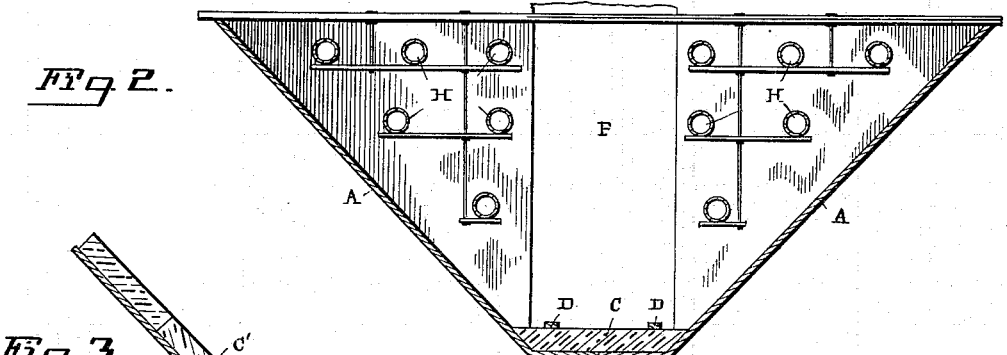
Figure 3:
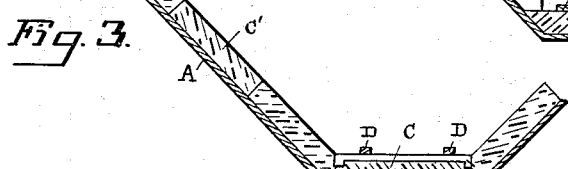
Figure 4:
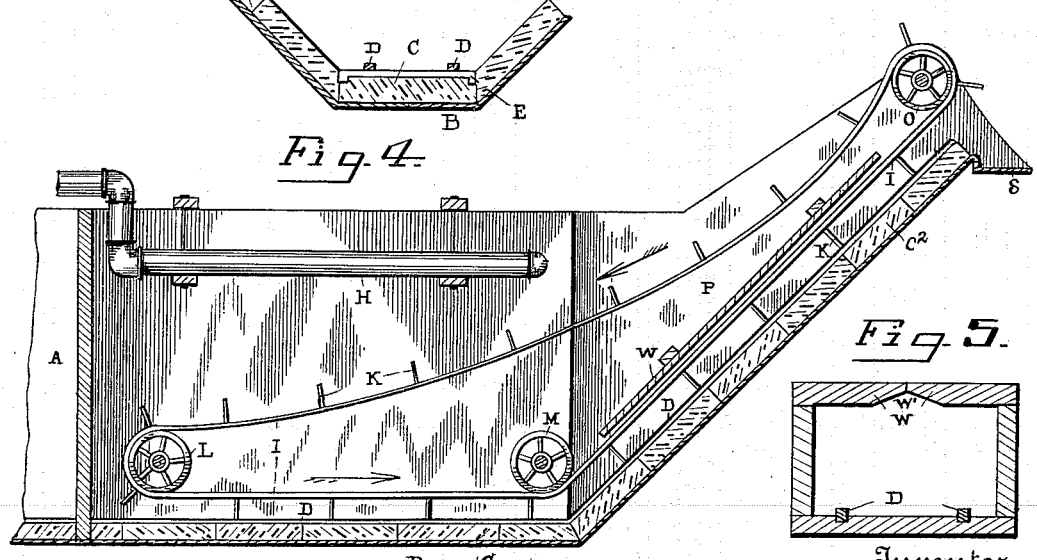
Figure 5:
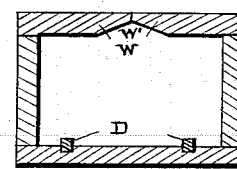

Figure 1 is a cross-section of a pan or grainer with inclined sides and a non-corrodible lining and having other features hereinafter referred to. Fig. 2 is a cross-section of such a pan or grainer lined only on the bottom, looking toward the spout. Fig. 3 is a broken cross-section of a pan with inclined sides lined at sides and bottom and having a track held on the lining by cross-bars. Fig. 4 is a longitudinal section of a grainer with a lined bottom and a track extending lengthwise and a mechanical raker moving on said track; Fig. 5, a cross-section of spout-lining.

A indicates the walls of the pan. The body of the pan is preferably composed of steel plates riveted together. The pan may be supported externally by any suitable braces, as in my Patent No. 536,180, dated March 26, 1895. The sides of the pan are inclined at such an angle that salt formed in the pan, dropping on the sides, will slide down to the narrow bottom of the pan.

B denotes the approximately flat or horizontal metallic bottom to the pan. Inside this bottom I place a lining of material not corrodible by salt or brine, preferably tiles or stone slabs C.

By preference I make a longitudinal track of metal, consisting of small rails D, of flat or strap iron or the like. These track-bars, generally not more than one-fourth to one-half of an inch in thickness, may be secured by dowels, pins, or rivets directly to the lining-plates C, or the track-rails may be secured to light bars or ties E, which extend across the bottom lining-slabs and turn down at the sides thereof.

The sides of the pan may be lined by stone slabs, tiles, or other non-corrodible pieces C', and the side and bottom slabs may be made to brace each other in various ways. (See Figs. 1 and 3.)

The heating-pipes H are suspended in any suitable manner, as in my patent referred to or otherwise.

An endless chain I, having buckets or scrapers K, passes under the sprocket-wheels L M and so to the driving-sprocket O a little above the inclined end of the pan, as in my patent referred to. The end of the pan is carried out in the form of a spout P, said spout being preferably of about the width of the flat bottom of the pan. Aside from this spout the ends of the pan may be either vertical or inclined and are braced in any suitable manner.

The spout P may be lined with stone, tile, or wood, and preferably the track D will continue up the bottom of the inclined spout. The spout must rise at least as high as the surface of the brine in the pan and may rise higher than the sides of the pan. The sprocket-wheel O is directly above the draining-board S, and as the endless chain moves, driven by sprocket-wheel O, the rakes K, carried by said chain, will ride with their lower edges in contact with rails D, and will thus be prevented from scraping or wearing the lining-slabs at the bottom of the pan and spout. A film of salt of the thickness of the rails D will accumulate and remain on the bottom or lining of the pan, but this does no harm.

Where the endless conveyer-chain rides up the inclined spout, I have found difficulty in raking up the salt, as the brine, flowing back from the conveyer, has a tendency to carry the salt with it. This tendency I overcome by placing a shield, cover, or guard W across the spout above the chain I and close to said chain. The chain thus moves up the inclined end or spout in a chute or box a little larger in section than the face of the rakes or hoes K. The brine carried up by the conveyer flows readily back into the trough.

Steam may be supplied to the heating-pipes H in any suitable or usual manner, and brine is fed to the pan in any usual way. As soon as salt begins to form in the pan it slides down the inclined sides of the pan to the flat bottom. Then the mechanical raker being driven in the direction of the arrow salt is raked along the flat bottom of the pan, the non-corrodible lining keeping the salt clean and white and the track serving to protect said lining against the wear and scraping of the rakes. I have found that wooden lining does well for the spout, but a stone or tile lining is better for the body of the pan and is almost indispensable if the whiter salt is to be made.

The non-corrodible lining, when composed of stone slabs or of tiles, may be laid in cement, or the slabs may be connected to each other by plugs or dowels. The lining for the flat bottom may be made to brace and hold the slabs of the side lining.

The tracks may be held to the bottom plates or to the cross-bars, as is found preferable. By using a heavy chain and raking apparatus the rakes or hoes will ride close to the tracks, which should be so made that the track-joints will not obstruct the hoes of the conveyer.

The cover or shield W, I have made of planks, two planks being beveled at their edges and joined so as to make a groove W', in which the sprocket-chain is guided. The tracks D may be sunk in the bottom of the spout-lining, as shown in Fig. 5.

What I claim is—

1. In a salt-evaporator, the metallic pan having inclined sides and a flat bottom, and an inclined spout at one end, the track-rails secured to the flat bottom, and the mechanical raker moving lengthwise of the flat bottom and supported by the track-rails, all combined substantially as described.

2. In a salt-evaporator, the metallic pan having inclined sides and a narrow flat bottom lined with non-corrodible material, the metallic track running lengthwise of said bottom and the mechanical raker having its hoes supported by said track, all combined substantially as described.

3. In a salt-evaporator, the metallic pan having inclined sides and a flat bottom, the spout having an inclined bottom in continuation of the flat bottom of the pan, the mechanical raker, and the track extending along the flat bottom of the pan and up the inclined bottom of the spout, and supporting the mechanical raker, all substantially as described.

In testimony whereof I affix my signature in presence of two witnesses.

NATHAN S. BEARDSLEE.

Witnesses:
W. A. BARTLETT,
C. K. DAVIES.